United States Patent [19]
Lange

[11] 3,709,129
[45] Jan. 9, 1973

[54] CAMERA WITH RETRACTABLE OBJECTIVE

[75] Inventor: Karl-Heinz Lange, Bunde, Germany

[73] Assignee: Balda-Werke, Bunde (Westf.), Germany

[22] Filed: July 8, 1971

[21] Appl. No.: 160,674

[30] Foreign Application Priority Data

Aug. 19, 1970 Germany.....................P 20 41 187.4

[52] U.S. Cl. ..........................95/39, 95/32, 350/255
[51] Int. Cl. ............................................G03b 17/04
[58] Field of Search..............95/39, 32, 44 R, 45, 46; 350/255

[56] References Cited
UNITED STATES PATENTS

| | | | |
|---|---|---|---|
| 3,185,059 | 5/1965 | Durst | 95/45 X |
| 2,273,555 | 2/1942 | Barnhart | 95/45 |
| 2,358,321 | 9/1944 | Fassin | 95/39 X |
| 3,585,916 | 6/1971 | Lange | 95/39 |
| 3,163,701 | 12/1964 | Staubach | 350/255 X |
| 3,504,605 | 4/1970 | Scudder et al. | 95/39 X |

Primary Examiner—Robert P. Griener
Attorney—Alex Friedman et al.

[57] ABSTRACT

A camera having an objective which is retractable from an outer operating position to an inner inoperative position. A manually operable structure coacts with the objective for giving the operator the capability of controlling the movement of the objective both inwardly to its inoperative position and outwardly to its operative position.

21 Claims, 10 Drawing Figures

INVENTOR.
KARL-HEINZ LANGE

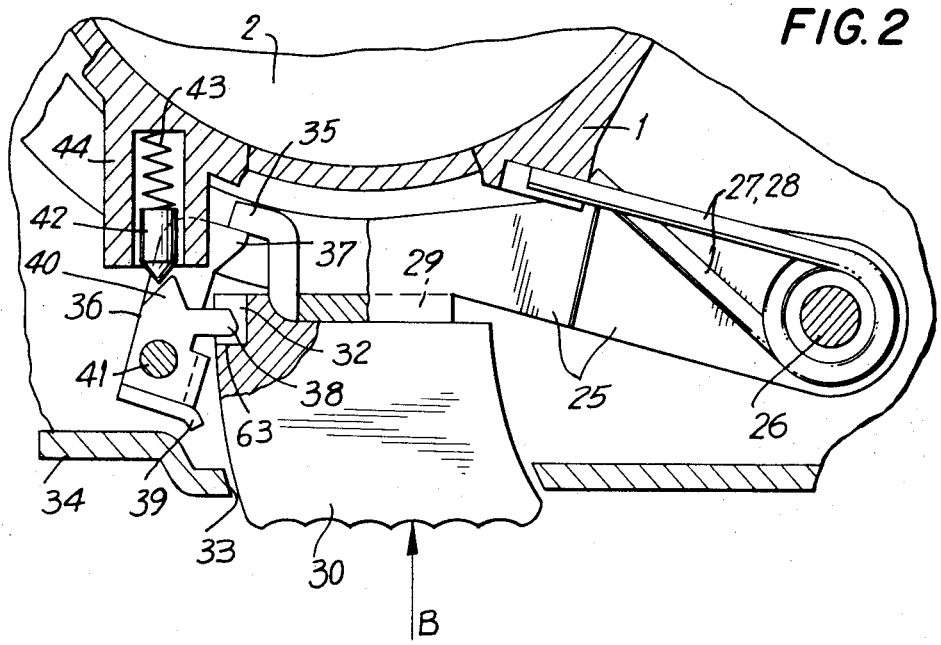
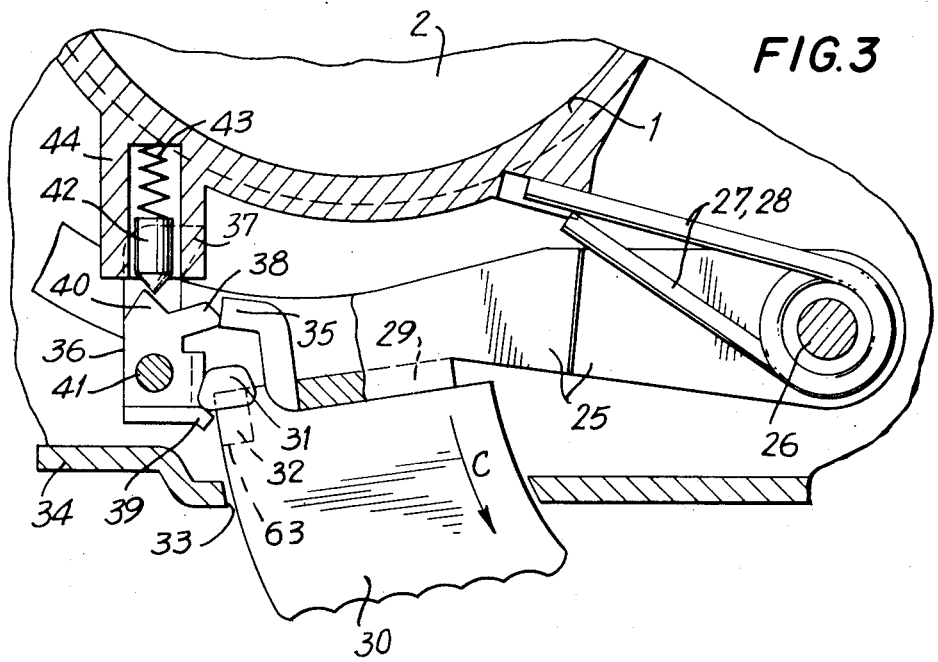

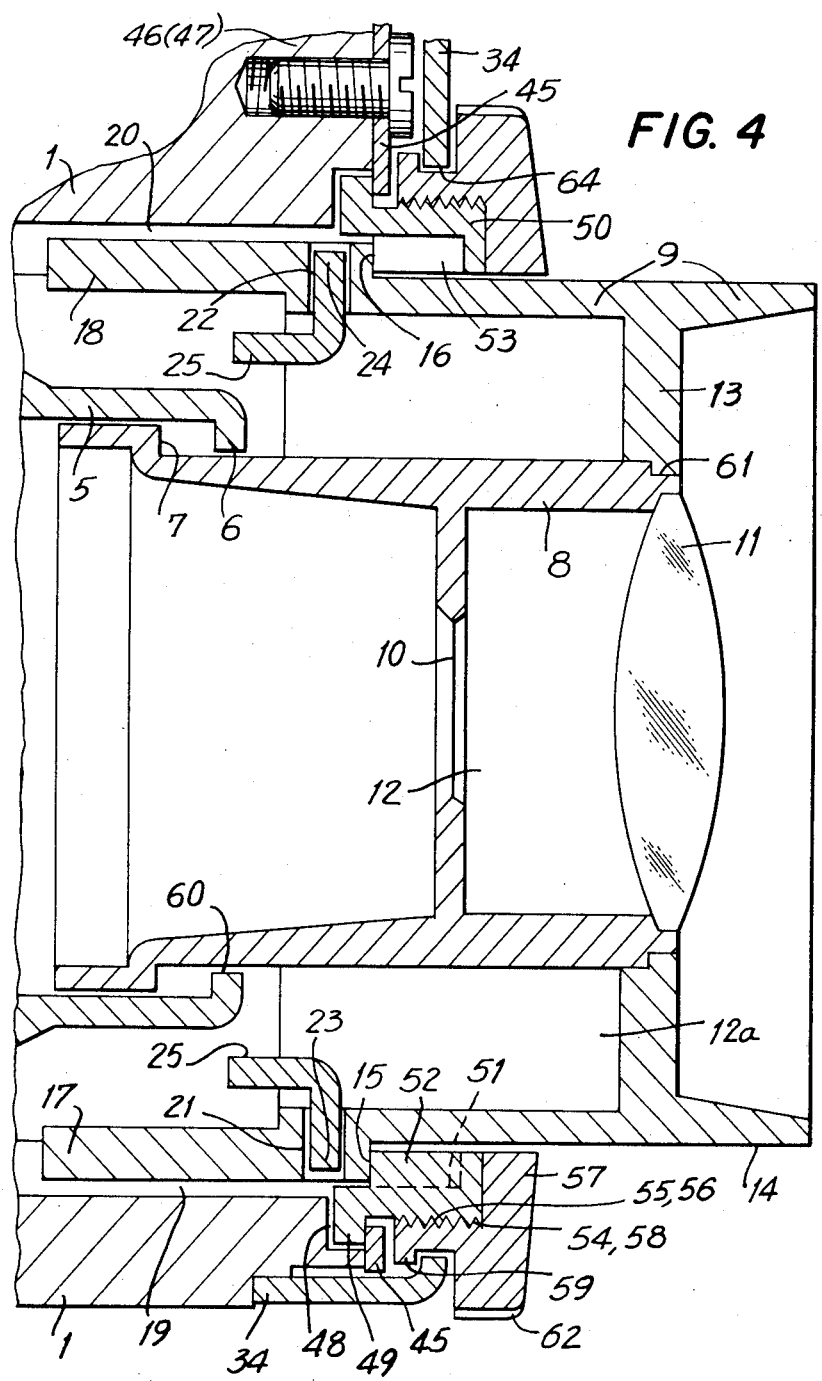

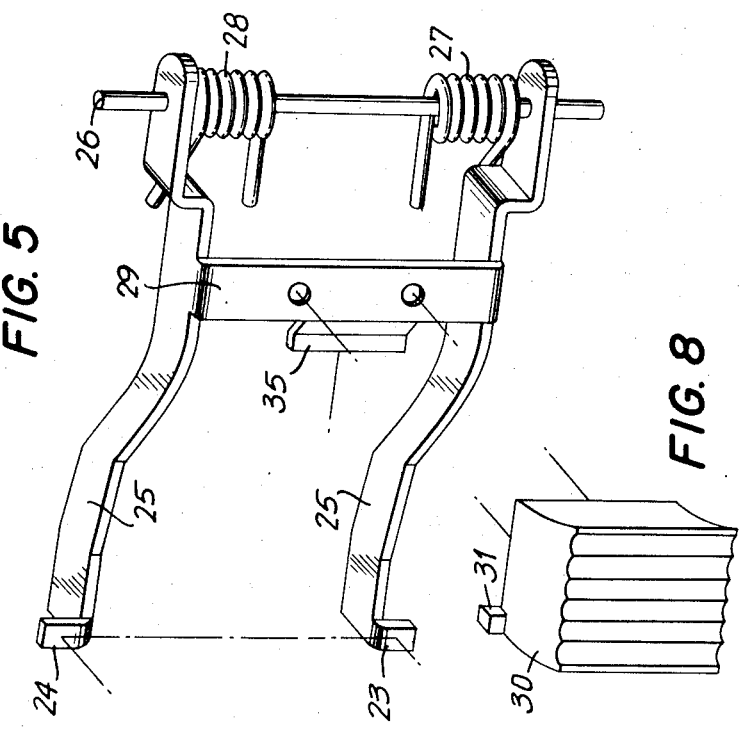
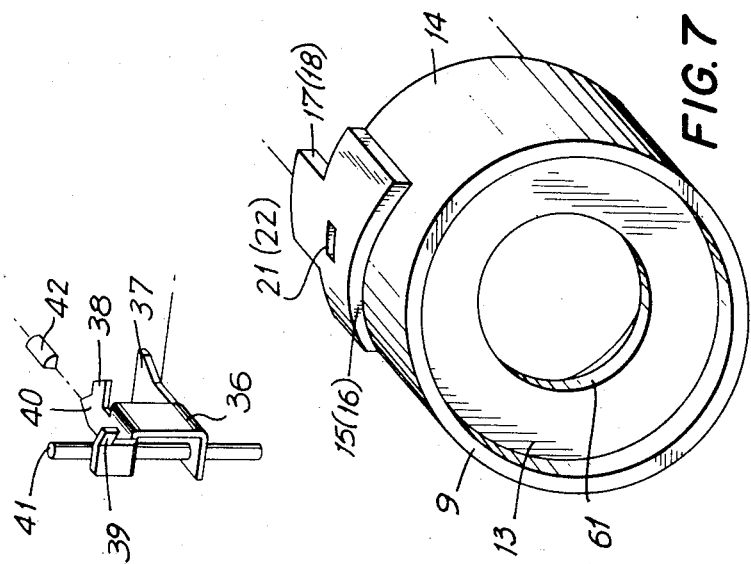

INVENTOR.
KARL-HEINZ LANGE

CAMERA WITH RETRACTABLE OBJECTIVE

BACKGROUND OF THE INVENTION

The present invention relates to cameras.

In particular, the present invention relates to that type of camera where the objective forms part of a retractable tube and where the objective is adjustable in accordance with the distance between the object and the camera. With most cameras of this general type, the carrier for the objective is made retractable so as to reduce the volume occupied by the camera when it is not used and so as to increase the convenience with which the camera may be used.

Cameras of this general type are not new. For example, there are known cameras of this general type where the tube of the objective is pulled out by hand and can be locked in its outer position after being turned. Moreover, it has been proposed to provide various types of springs which act on the tube of the objective so as to drive the objective out to its operative position after it is unlocked. In addition, there are spreadable lever systems and rack and pinion systems used for moving the objective tube between its outer operative and inner retracted positions. In order to adjust such objectives in accordance with the distance from the camera to the object, there are known constructions where the tube rests at one edge on a distance adjusting ring threadedly carried by the camera housing.

The above known constructions are not free of drawbacks since it is often necessary, in order to provide a favorable cost for the camera, to make concessions which are achieved only at the sacrifice of the reliability of the operation, the accuracy of the construction, and the simplicity of the operation. Thus, for example, it is extremely inconvenient and time consuming to require the operator to move the tube which carries the objective by hand out to its operating position and then to lock it in its operating position. Also, the use of springs which act directly on the carrier of the objective requires particular measures and guiding structure so that the tilting and clamping of the objective tube while it is driven outwardly is avoided. Furthermore, the adjustment for the distance can only be effectively achieved with expensive structure such as, for example, threaded guides or suitably machined cams.

It has already been proposed to provide a favorable cost for such a camera by utilizing for the retractable objective tube components made of plastic materials. However, such cameras at the present time cannot be adjusted for particular distance between the object and the camera.

SUMMARY OF THE INVENTION

It is accordingly a primary object of the present invention to provide a camera of the above general type which is capable not only of having a retractable objective carrier but also of adjusting the distance between the object and the camera while avoiding all of the above drawbacks, with the camera of the invention being reliable in its functioning and fully satisfactory in all respects, while at the same time utilizing relatively inexpensive plastic materials which can be die cast, for example, and which can be easily assembled.

A further object of the present invention is to provide a construction of the above general type which enables the operator to control both the movement of the objective carrier out to its operative position as well as the movement thereof inwardly to its retracted position.

Yet another object of the present invention is to provide an arrangement which makes it possible for the operator even when holding the camera before his eye to easily manipulate a suitable control for bringing about movement of the objective out to its operative position, with an equally convenient control being provided for return of the objective to its retracted position.

Also, it is an object of the present invention to provide a structure which eliminates any possibility of manipulations in the region of the objective itself so that soiling of the objective with fingerprints and the like is avoided with all of the manipulations being carried out at a distance from the objective so that there is an exclusion of any possible manipulations at the objective itself.

A further object of the present invention is to provide a construction which makes it possible for the operator to retard the extent to which the objective is driven by a spring out to its operative position, so that by this manual retarding or braking of the outward movement of the objective to its operative position it is possible to avoid a sudden, hard impact of the objective when it reaches its outer operative position, thus avoiding undesirable vibration of the camera.

Thus, it is an object of the present invention to provide a structure of the above general type which will prevent any disturbance in the adjustment of components or any excessive stressing of delicate elements such as a range finder, a light meter, as well as electrical indicating structure.

In addition, it is an object of the present invention to provide a structure of the above general type which enables a structure for adjusting the objective to the distance between the camera and the object to be carried out with a minimum of manufacturing technicalities with great ease in the adjustment and mounting of the distance-setting structure for the objective.

In accordance with the invention the camera includes a cylindrical retractable tube which carries the objective and which is controlled in its movement between its outer operative and inner retracted positions by a manually operable means which includes a transmission operatively connected with the tube and controlled by the operator both during its outward movement as well as its inward movement.

BRIEF DESCRIPTION OF THE DRAWINGS

The invention is illustrated by way of example in the accompanying drawings which form part of this application and in which:

FIG. 2 is a fragmentary sectional plan view showing components of FIG. 1 at a scale larger than FIG. 1 in a position where a motion transmission has been returned and locked in the retracted condition;

FIG. 3 shows the structure of FIG. 2 in the position which the parts take immediately after unlocking of the transmission;

FIG. 4 is a sectional elevation, at an enlarged scale as compared to FIG. 1, showing further details of the structure;

FIG. 5 is a perspective illustration of the transmission;

FIG. 6 is a perspective illustration of a releasable lock means;

FIG. 7 is a perspective illustration of the outer tube of the objective assembly;

FIG. 8 is a perspective illustration of the manually engageable element of the manually operable means forming the transmission of FIG. 5;

DESCRIPTION OF PREFERRED EMBODIMENTS

Figure 1:
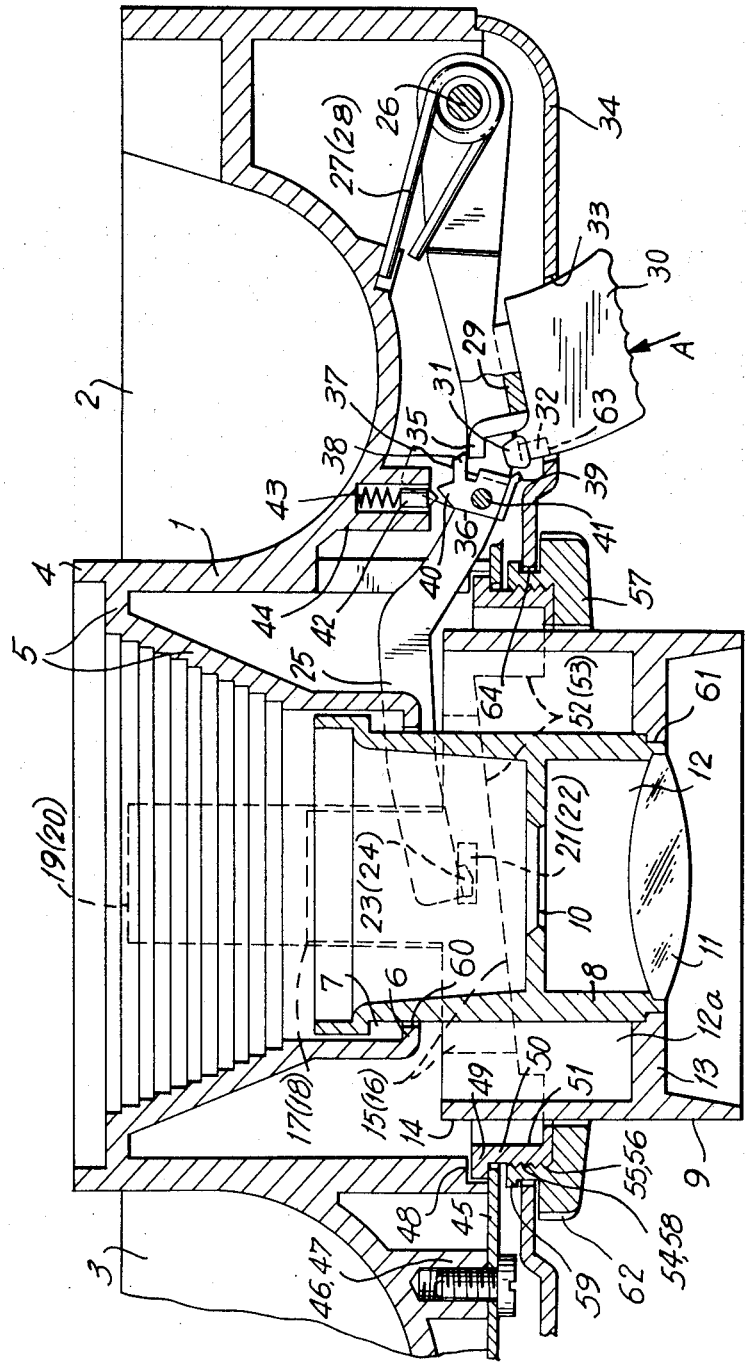
FIG. 1 is a fragmentary sectional plan view of the front part of a camera provided with the structure of the invention, the structure being shown in FIG. 1 with the objective in its outer objective objective position and with transmission transmission which is connected to the objective shown in its elongated condition, the camera structure being shown in FIG. 1 in a position ready to make an exposure.

Referring first to FIGS. 1 and 4, there is fragmentarily illustrated therein a camera housing 1 provided with a pair of chambers 2 and 3 in which the film is located. This film will be located in a suitable cassette having portions extending into the chambers 2 and 3 with part of the casette engaging the edge region 4 of the housing 1. This edge region 4 is situated at the rear or inner end of a tapered light-guiding tube 5. At its forward, smaller end this tapered light-guiding tube 5 is provided with an inwardly directed circular flange 6. This flange 6 is adapted to be engaged by an outwardly directed shoulder 7 which is formed at the inner end of an inner tube 8 of the objective carrier structure. Thus, in the outer position of the objective which includes the lens 11 the shoulder 7 will engage the flange 6, and the inner peripheral edge of the latter guides the tube 8 by coacting with the exterior surface thereof.

The cylindrical tube 8 not only carries, at its front end, the lens 11, but in addition it is provided with a transverse wall formed with the exposure aperture 10, and between this partition and the lens 11 there is a chamber 12 adapted to accomodate, in an unillustrated manner, components such as the mechanism of the shutter and diaphragm.

The objective assembly includes in addition to the inner tube 8, an outer concentric tube 9 provided with an inner flange 13 capable of being screwed onto or glued to the outer end of the tube 8 in an unillustrated manner. In this way the tubes 8 and 9 are fixed to each other through the flange 13. Proper fitting of elements 13 and 8 to each other are provided at the connecting portion 61 between these components.

At its exterior surface 14 the outer tube 9 of the objective carrier structure is provided with a pair of opposed cams 15 and 16 which extend parallel to the optical axis toward the interior of the camera forming extensions which are directed rearwardly from the rear edge of the outer tube 9. These extensions of the tube 9, extending rearwardly from the cams 15 and 16 are formed of dovetail guides 17 and 18 as illustrated in FIGS. 1, 4 and 7. These guides 17 and 18 are received in mating parallel grooves 19 and 20 which are formed in the camera housing 1 and which also extend parallel to the optical axis, as illustrated in FIGS. 1 and 4.

In the region of the cams 15 and 16 the outer tube 9 is formed with a pair of opposed openings 21 and 22 passing therethrough, and these openings respectively receive the angularly extending free end portions 23 and 24 of a pair of arms of a swingable motion-transmitting, manually operable means 25. This manually operable motion transmitting means 25 is illustrated in FIG. 5. An elongated rod 26 is carried by the camera housing and supports the motion transmitting means 25 for swinging movement about the axis of the rod 26. Moreover, a pair of springs 27 and 28 coact with the housing 1 and the opposed arms of the swingable motion-transmitting element 25 in order to urge the latter to swing about the pin 26 in a counterclockwise direction, as viewed in FIG. 1, so that through the extension of the free ends 23 and 24 into the openings 21 and 22 of the tube 9 the objective will be urged to its outer operative position by the spring means formed by the elements 27 and 28.

The opposed arms of the motion transmitting element 25 are interconnected by transverse member 29 to which a manually engageable element 30 of the motion transmitting means is fixed. This element 30 may be bolted to the transverse member 29 or formed directly thereon. The manually engageable element 30 is shown in FIG. 8 as well as in FIG. 1. Thus, as is apparent from FIG. 1 the element 30 extends through an opening 33 formed in the front wall 34 of the camera housing so that it is readily accessible to be operated by a finger of the operator at the front of the camera.

This element 30 which is preferably made of die-cast plastic is formed at its upper end with an operating projection 31 and beneath the projection 31 with a cutout 32. The cutout 32 is particularly apparent from FIG. 2.

The transverse connecting member 29 of the manually operable means 25 is also provided with a locking edge 35. This edge 35 coacts with a lock means which includes a locking pawl 36 supported for rotary movement in the camera housing 1 by way of vertically extending pivot pin 41. The lock means 36 has three lock and stop projections 37, 38, and 39, shown most clearly in FIG. 6. At its lower portion the lock means 36 has the locking projection 37. Parallel to the latter at an intermediate elevation of the lock means 36, the latter has an actuating projection 38 against which the element 30 strikes in order to swing the lock means 36 between a pair of positions referred to below. In a plane which is at right angles to the projections 37 and 38 the lock means 36 has the third projection 39 which also forms a projection against which the edge 35 strikes to change the position of the lock means. Thus, the lock projection 37 operates in the manner described in greater detail below with the lock edge 35 of the swingable element 25, the projection 38 coacts with the cutout 32 of the element 30, and the projection 39 coacts with the projection 31 of the element 30.

At an intermediate elevation the lock means 36 has a substantially pointed projection 40 with which a releasable holding structure coacts for releasably holding the lock means in one or the other of a pair of positions, these positions being respectively illustrated in FIGS. 2 and 3. The means for releasably holding the lock means in one or the other of its positions includes a pin 42 having a conical end coacting with and engaging the pointed projection 40, a spring 43 urging the pin 42 outwardly, and a tubular part 44 of the housing 1 in which the spring 43 and pin 42 are accommodated, as illustrated in FIGS. 2 and 3.

The housing 1 is provided at its front region with a pair of bosses 46 and 47 to which a plate 45 is fixed by suitable bolts. In addition, the front part of the housing 1 is provided with a circular recess 48 receiving a holding flange 49 of a cam ring 50, and the plate 45 extends over the flange 49 to retain the ring 50 at the position thereof shown in FIGS. 1 and 4. The cam ring 50 is provided at its inner surface 51 with a pair of opposed cams 52 and 53 which respectively engage the cams 15 and 16 carried by the outer tube 9 of the objective assembly, so that turning of the rotary cam ring 50 will result in axial displacement of the objective for focusing purposes. It will be noted that the springs 27 and 28 operate not only to move the objective out to its operating position but also to maintain the cams 15 and 16 respectively in engagement with the cams 52 and 53.

At its exterior surface 54 the cam ring 50 is provided with exterior teeth 55 which mesh with interior teeth 56 of a focusing or distance-adjusting ring 57, the latter ring being capable of being slipped onto the ring 50 in meshing engagement therewith. Thus, once the components 50 and 57 are assembled together they will rotate as one unit.

The objective-adjusting ring 57 is made of plastic and has at its inner end which is of a reduced diameter an integrally formed elastic catch flange 59 or it may be provided with suitable springy projections. The latter elastic or springy structure is formed in such a way that the adjusting ring 57 can be pressed with a relatively small force through the opening 64 of the front wall 34 before the latter is assembled with the remainder of the camera, and the springy flange or projections 59 snap behind the wall 34 to prevent the ring 57 from falling out of the opening 64. The springy flange or projections 59 will also prevent pulling of the ring 57 away from the camera ring 50. It is to be noted that because of the relatively small axial dimension of the ring 57 it does not provide sufficient area for grasping with a force great enough to pull it out of its assembled condition. As a variation the camera may be provided with an unillustrated structure according to which a bayonet type of connection can be provided through suitable notches at the opening 64, these notches receiving projections located at predetermined circumferencial positions along the ring 57 so that once these projections are passed through these notches the ring 57 can be turned to locate the projections behind the wall 34 after a relatively small turning of the ring 57. It is possible to provide a permanent prevention of removal of the ring 57 from the wall 34 by providing a further connection between the ring 57 and the wall 34 after an initial relatively small turning of the ring 57 with respect to the wall 34, so that a projection at the ring 57 can be situated between a pair of fixed stops of the housing 1, these stops being arranged in such a way that the extent of angular adjustment of the ring 57 is not sufficient to again place it in a position where it can be removed through the opening 64. At its exterior periphery which has a relatively large diameter it is possible to provide the ring 57 with a knurled circumferential edge 62 for convenience in manual turning of the ring 57.

The mounting of the most important elements of the focus-adjusting structure are as follows:

First the inner cylindrical tube 8 is introduced from the rear of the camera through the opening 60 at the front end of the light-guiding tube 5. Then the outer tube 9 is assembled with tube 8 from the front of the camera with the proper fitting of components 8 and 9 to each other being achieved by the portion 61. At this portion 61 components 8 and 9 may be threaded to each other or glued to each other. Then the cam ring 50 is placed with its retaining flange 49 in the circular recess 48 of the housing 1. The holding plate 45 is then bolted to the bosses 46 and 47 and the swingable motion-transmitting element 25 and lock means 36 are assembled with the structure. The swingable component 25 presses under the action of the springs 27 and 28 the tubular assembly 8, 9, in its guiding structure formed by components 17–20, at the cams 15 and 16 respectively against the opposing cams 52 and 43 of the cam ring 50. Since the front plate 34 with the focusing ring 57 mounted in the opening 64 thereof still has not been assembled with the remainder of the camera structure, it is possible to turn the cam ring by hand or with the aid of a special tool which can engage the exterior teeth 55, so that by way of the cams 15, 16 and 52, 53 the objective 11, carried by the tubular assembly 8, 9, can be set at the proper position along the optical axis by way of a suitable testing apparatus which indicates when the objective 11 has been properly situated with respect to the film plane.

Now the front plate 34 with the focusing ring 57 assembled therewith is mounted on the camera in such a way that the ring 57 moves along the exterior of the outer tube 9 and with the ring 57 properly positioned circumferentially, as by alignment of a suitable index with a distance scale, the inner teeth 56 are placed in mesh with the outer teeth 55 of the cam ring 50. Because the teeth 54, 58 are relatively small and located relatively close to each other, even where there are relatively close tolerances it is possible to provide the required adjusted position with the required accuracy. At the same time, the mounting of the ring 57 on the cam ring 50 prevents inner springing or retraction of the elastic flange or projections 59, so that the cam ring 50 coacts with the adjusting ring 57 to prevent disassembly of the latter from the plate 34. In this way pulling of the ring 57 out through the front plate opening 64 without first disassembling the plate 34 is not possible. The required limits to the extent of turning of the focusing ring 57 can, for example, be achieved by providing the ring 57 with an integral projection situated between a pair of stops of the housing which are suitably spaced from each other. Where a bayonet type of connection is provided for the ring 57, the assembly takes place in a similar manner. In this case also the front plate 34 and the focusing ring 57 are first assembled together by displacing the ring 57 through the opening 64 and then turning the ring 57 to a small extent so as to prevent it from falling out of the opening 64. The limits to the turning of the ring 57 are provided in the same way as the construction described above by situating a projection of the ring between corresponding stops of the housing 1. Pulling of the focusing ring 57 off from the wall 34 is only possible after the wall 34 has been disassembled from the remainder of the camera since only then can the focusing ring 57 have a position which is required for movement through the opening 64.

The operation of the structure for releasably holding and locking the objective assembly in its outer and inner positions is as follows:

Assuming that the tubular assembly 8, 9 is in its outer operating position illustrated in FIG. 1 and that the operator pushes element 30 rearwardly in the direction of the arrow A of FIG. 1, for the purpose of returning the camera to its condition of non-use, then the motion-transmitting means 25 will turn about the pin 26 in a clockwise direction, as viewed in FIG. 1, and the objective carrier structure 8, 9 is displaced rearwardly along the optical axis by the engagement of the angular projections 23 and 24 in the openings 21 and 22, and at this time the extensions 17 and 18 will be guided along the grooves 19 and 20 of the housing 1. At the same time the locking edge 35 of the manually operable means 25 moves behind the locking projection 37 of the releasable lock means 36, with the parts now assuming the position shown in FIG. 2 since the yieldable resilient holding means 42-44 easily yields to the small extent required to permit the edge 35 to snap behind the projection 37 while the lock means 36 remains in the angular position illustrated in FIG. 2. Now the means 25 is locked in its retracted position in opposition to the springs 27, 28 and at the same time the objective carrier structure 8, 9 is retained in its inner, retracted position.

Assuming now that it is desired to make an exposure, so that the objective assembly 8, 9 is to be returned to its outer operating position shown in FIG. 1, then the operator will again push on the element 30, displacing it in the direction of the arrow B shown in FIG. 2. As a result the edge 63 which defines part of the cutout 32 strikes against the projection 38 to turn the lock means 36 about the pin 41 in a counterclockwise direction, as viewed in FIG. 2, through an angle sufficient to displace the pointed projection 40 to the other side of the conical tip of the pin 42, in opposition to the spring 43, so that now the lock means 36 will remain in its second position which is illustrated in FIG. 3. During this turning of the lock means 36 about the pin 41, the projection 37 is displaced to an angular position where it releases the locking edge 35 so that now the operator can move his finger in the direction of the arrow C, and the springs 27, 28 will displace the means 25 in a counterclockwise direction about the pin 26 so as to move the objective carrier structure outwardly to its operative position until the cams 15 and 16 respectively engage the cams 52 and 53. The locking edge 35 can now move freely past the locking projection 37 and the projection 38, as is apparent from FIG. 3. In this way the objective carrier structure is displaced to its outer operating position. However, shortly before reaching its outer end position the projection 31 of element 30 strikes against the projection 39 of the lock means 36 and swings the latter to return it, in opposition to the spring 43, back to the position shown in FIG. 2, so that now the parts have the position shown in FIG. 1, and therefore when the element 30 is again disclosed in the direction of the arrow A of FIG. 1 the structure can again be locked in its retracted position.

Focusing is brought about in a simple and reliable manner by turning of the focusing ring 57 which is prevented from turning with respect to the cam ring 50 by the meshing teeth 55 and 56, and by way of the cams 52 and 53 and the cams 15 and 16 respectively coacting therewith the objective 11 and the structure 8, 9 are adjusted along the optical axis to provide the proper position for achieving a sharp image of the object at the film plane.

Figure 9:
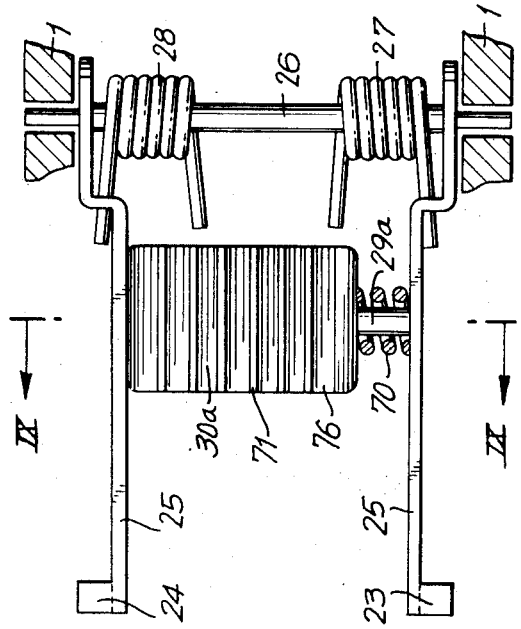
FIG. 9 is a fragmentary front elevation of another embodiment of a control structure of the invention.
Figure 9A:
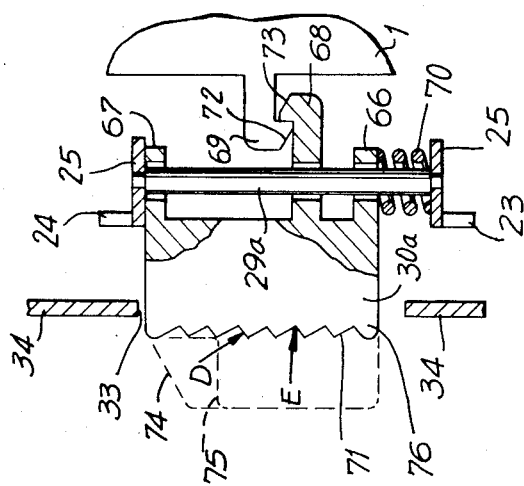
FIG. 9a is a sectional elevation of the structure of FIG. 9 taken along the line IX—IX OF FIG. 9 in the direction of the arrows and showing in phantom lines a variation of the element which is to be engaged by the operator.

With the embodiment of the invention which is illustrated in FIGS. 9 and 9a the locking of the objective carrying structure is brought about by replacing the transverse member 29 with a transverse pin 29a extending between the arms of the manually operable means 25. This pin 29a serves to support for axial movement along the pin 29a a manually-engageable element 30a. This element 30a is provided with a pair of bearing eyes 66 and 67 through which the pin 29a extends, as shown most clearly in FIG. 9a. In addition the element 30a is provided with a locking hook 68 which coacts with a fixed or stationary locking hook 69 carried by the housing 1. A spring 70 is coiled about the lower portion of the pin 29a and urges the element 30a upwardly to the position shown in FIGS. 9 and 9a. At its front portion which extends through the opening 33 of the front plate 34, the element 30a has the knurled surface 71 adapted to be enaged by the finger of the operator and permitting the operator to apply pressure in the direction of the arrow D in opposition to the spring 70 to displace the element 30a downwardly along the pin 29a. This manually engageable surface 71 of the operating part 76 can for example, also have an inclined surface region 74 or a stepped surface region 75, as shown in dotted lines in FIG. 9a, in order to assure a reliable operation of the element 30a. The front plate 34 is provided at the opening 33 with a pair of opposed side edges which guide the element 30a for vertical movement along the pin 29a.

This embodiment of the invention operates as follows:

If the camera is to be displaced from its inoperative to its operative position, the operator depresses the element 30a in opposition to the spring 70 in a downward direction, indicated by the arrow D, and in this way the hook 68 is unlocked from the hook 69. When the operator now releases the finger pressure on element 38 to a small extent, the swingable means 25 is urged by the springs 27 and 38 outwardly so as to displace the tubular assembly 8, 9 to its operative position. At the same time the hook 68 moves beyond the range of the hook 69 so that during the initial phase of the displacement of the camera to its operative position the operator can release the button 30a entirely, if he so desires, and now the springs 27 and 28 will drive the tubular structure 8, 9 out to its operative position. However, in this case, as well as in the embodiment of FIG. 1-8, the operator will provide a braking action on the outward movement of the objective by holding his finger in engagement with the operating element. After the exposures have been made and it is desired to return the camera to its position of non-use, the operator need only push the element 30a inwardly in the direction of the arrow E shown in FIG. 9a. In this way at the final phase of the return movement, the hook 68 will ride with its inclined edge 73 along the inclined edge 72 of the hook 69 and will then snap behind the latter hook so as to releasably lock the components in the retracted position.

It is to be noted that with this embodiment of the invention, it is also possible to provide different variations without going beyond the invention. For example, the locking hooks 68 and 69 can be arranged in such a way that the unlocking action takes place by angular turning of element 30*a* about the pin 29*a*. In this way a mounting of the element 30*a* for shiftable axial movement along the pin 29*a* can be eliminated. Thus, the description and drawings are only illustrative of an example of the invention and do not have a limiting character.

What is claimed is:

1. In a camera, an objective, support means supporting said objective for retractable movement from an outer operating position to an inner inoperative position, manually operable means engageable at the exterior of the camera and operatively connected to said objective for moving the latter both outwardly to its operative position and inwardly to its inoperative position, and releasable lock means coacting with said manually operable means for locking and unlocking the latter in response to movement of said manually operable means to displace said objective between said outer operative and inner inoperative position thereof.

2. The combination of claim 1 and wherein said manually operable means has a pair of portions operatively connected with said objective for transmitting movement thereto.

3. The combination of claim 2 and wherein a support means supports said manually operable means for swinging movement and wherein a spring means coacts with said manually operable means for urging the latter to a position which locates the objective in said outer operative position thereof.

4. The combination of claim 3 and wherein said support means supports said releasable lock means for movement only to a pair of predetermined positions.

5. The combination of claim 4 and wherein a pawl means is carried by said support means and coacts with said releasable lock means for releasably holding the latter in one or the other of its positions.

6. The combination of claim 5 and wherein said releasable lock means has three projections respectively situated in different planes and respectively coacting with three different portions of said manually operable means.

7. The combination of claim 6 and wherein said manually operable means has a manually engageable portion fixed thereto.

8. The combination of claim 7 and wherein said manually engageable portion is made of plastic and affixed to the remainder of said manually operable means.

9. The combination of claim 6 and wherein said manually operable means has a manually engageable portion thereof independent of the remainder of said manually operable means and includes an intermediate connecting component for establishing or releasing a connection between said manually engageable portion of said manually operable means and the remainder thereof.

10. The combination of claim 4 and wherein said manually operable means is movable with respect to said lock means without displacing the latter from one of the positions thereof when said manually operable means displaces said objective to said outer operative position thereof until said manually operable means locates the objective at the last region of its movement to its outer operative position whereupon said manually operable means moves said lock means to its other position for coacting with said manually operable means for releasably holding the latter in its locking position during subsequent actuation of said manually operable means.

11. The combination of claim 10 and wherein said manually operable means returns said lock means to its first position during an initial actuation of said manually operable means, first releasing the latter for displacing said objective to its outer position during subsequent movement of said manually operable means.

12. The combination of claim 11 and wherein said manually operable means at the end of its displacement of the objective to its outer operating position returns the lock means to its position where it will again lock the manually operable means in the position holding the objective at its inner inoperative position.

13. The combination of claim 1 and wherein said manually operable means carries a manually engageable element which is movable with respect to the remainder of said manually operable means, the latter having a spring which urges said manually engageable element to a predetermined rest position.

14. The combination of claim 13 and wherein said manually engageable element is operatively connected with a lock means for releasably locking the manually operable means in a position retaining the objective at its inner inoperative position.

15. The combination of claim 14 and wherein said manual engageable element has engaging surfaces to be engaged by the operator for displacing said manual engageable element first to a position releasing said manually operable means and then controlling the movement of said manually operable means for manually controlling the movement of the objective.

16. The combination of claim 1 and wherein the objective include an outer tubular portion and an inner tubular portion surrounded thereby, said outer tubular portion having an inner flange connecting said outer tubular portion to said inner tubular portion and said inner tubular portion having an interior space for accommodating camera components such as a diaphragm, shutter, and the like, said outer tubular portion carrying cams at its exterior while said support means includes guides coacting with said cams for guiding said outer tubular portion for movement along the axis of the objective.

17. In a camera, an objective, support means supporting said objective for retractable movement from an outer operating position to an inner inoperative position, manually operable means engageable at the exterior of the camera and operatively connected to said object for moving the latter both outwardly to its operative position and inwardly to its inoperative position, said objective including an outer tubular portion and an inner tubular portion surrounded thereby, said outer tubular portion having an inner flange connecting said outer tubular portion to said inner tubular portion and said inner tubular portion having an interior space for accommodating camera components such as a diaphragm shutter, and the like, said outer tubular portion carrying cams at its exterior while said support means includes guides coacting with said cams for guiding said outer tubular portion for movement along the axis of the objective, the camera having a front wall formed with an opening and a cam ring being turnable in said opening and coacting with said cams on said outer tubular portion for displacing the latter along the optical axis.

18. The combination of claim 17 and wherein said outer tubular portion has in the region of camming surfaces of said cams portions which are operatively connected with said manually operable means.

19. The combination of claim 18 and wherein a spring means which acts on said manually operable means to urge the latter and said objective to a position locating said objective in its outer operative position also acts to maintain the camming edges in operative engagement with each other.

20. The combination of claim 19 and wherein an objective adjusting ring is made of plastic and is supported by a front wall of the camera for rotary movement, said adjusting ring being operatively connected with said cam ring for turning the latter and coacting with the camera front wall for preventing removal of said adjusting ring.

21. The combination of claim 20 and wherein said adjusting ring has springy holding elements which when pressed through an opening in the front wall of the camera snap behind the latter for preventing removal of said adjusting ring.

* * * * *